(12) United States Patent
Baker

(10) Patent No.: US 9,855,982 B2
(45) Date of Patent: Jan. 2, 2018

(54) AERODYNAMIC REAR DRAG REDUCTION SYSTEM FOR A TRAILER

(71) Applicant: WABASH NATIONAL, L.P., Lafayette, IN (US)

(72) Inventor: Leonard W. Baker, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/928,056

(22) Filed: Oct. 30, 2015

(65) Prior Publication Data

US 2016/0046333 A1 Feb. 18, 2016

Related U.S. Application Data

(63) Continuation of application No. 14/049,506, filed on Oct. 9, 2013, now Pat. No. 9,199,673.

(60) Provisional application No. 61/720,163, filed on Oct. 30, 2012.

(51) Int. Cl.
*B62D 35/00* (2006.01)

(52) U.S. Cl.
CPC .................. *B62D 35/001* (2013.01)

(58) Field of Classification Search
CPC .............................. B62D 35/007; B62D 37/00
USPC ........................................... 296/180.1–180.5
See application file for complete search history.

(56) References Cited

U.S. PATENT DOCUMENTS

| | | | |
|---|---|---|---|
| 2,933,344 A | 4/1960 | Shumaker | |
| 3,010,754 A | 11/1961 | Shumaker | |
| 3,276,811 A | 10/1966 | Schmidt | |
| 3,596,975 A | 8/1971 | Stephen | |
| 3,960,402 A | 6/1976 | Keck | |
| 3,999,797 A | 12/1976 | Kirsch et al. | |
| 4,142,755 A | 3/1979 | Keedy | |
| 4,214,787 A | 7/1980 | Chain | |
| 4,309,053 A | 1/1982 | Lett | |
| 4,316,630 A | 2/1982 | Evans | |

(Continued)

FOREIGN PATENT DOCUMENTS

| | | |
|---|---|---|
| DE | 102008036888 A1 | 2/2010 |
| DE | 102013006376 A1 * | 10/2014 |
| EP | 0197239 A2 | 10/1986 |
| WO | WO/2013/188669 | 12/2013 |

OTHER PUBLICATIONS

Aerodynamic Trailer Systems, LLC SmartTail® The Trucking Industry's First Totally Automated Trailer Air Spoiler from www.ats-green.com/smarttail.htm (2pages), Jan. 13, 2014.

(Continued)

*Primary Examiner* — Hilary L Gutman
(74) *Attorney, Agent, or Firm* — Quarles & Brady LLP

(57) ABSTRACT

A drag reduction system is configured to be coupled to a rear frame assembly of a trailer including a rear swing door and a rear frame. The drag reduction system includes a main wall panel configured to be coupled to a vertical member of the rear frame to extend generally rearwardly of the trailer at least partially along a height of the trailer. The main wall panel is pivotable relative to the rear frame between a deployed position wherein the inner surface of the wall panel is spaced-apart from the outer surface of the rear swing door, and a stowed position wherein the inner surface of the wall panel is adjacent to and engaged with the outer surface of the rear swing door.

19 Claims, 4 Drawing Sheets

(56) References Cited

U.S. PATENT DOCUMENTS

| | | |
|---|---|---|
| 4,320,920 A | 3/1982 | Goudey |
| 4,357,045 A | 11/1982 | Kinford, Jr. |
| 4,417,760 A | 11/1983 | Koch |
| 4,421,354 A | 12/1983 | Lemaster |
| 4,508,380 A * | 4/1985 | Sankrithi ............... 296/180.4 |
| 4,671,555 A | 6/1987 | Linz et al. |
| 4,682,808 A * | 7/1987 | Bilanin ............... 296/180.4 |
| 4,735,381 A | 4/1988 | Wood |
| 4,809,003 A | 2/1989 | Dominek et al. |
| 4,881,772 A | 11/1989 | Feinberg |
| 4,978,162 A | 12/1990 | Labbe' |
| 5,112,120 A | 5/1992 | Wood |
| 5,199,762 A | 4/1993 | Scheele et al. |
| 5,280,990 A | 1/1994 | Rinard |
| 5,374,013 A | 12/1994 | Bassett et al. |
| 5,375,903 A * | 12/1994 | Lechner ............... 296/180.1 |
| 5,382,070 A | 1/1995 | Turner |
| 5,498,059 A | 3/1996 | Switlik |
| 5,658,038 A | 8/1997 | Griffin |
| 5,823,610 A | 10/1998 | Ryan et al. |
| 5,901,925 A | 5/1999 | McGrath et al. |
| 5,901,929 A | 5/1999 | Banks |
| 6,092,861 A | 7/2000 | Whelan |
| 6,131,853 A | 10/2000 | Bauer et al. |
| 6,241,302 B1 | 6/2001 | Rehkopf |
| 6,257,654 B1 * | 7/2001 | Boivin et al. ............. 296/180.5 |
| 6,286,892 B1 | 9/2001 | Bauer et al. |
| 6,485,087 B1 * | 11/2002 | Roberge et al. ........... 296/180.5 |
| 6,616,218 B2 | 9/2003 | Bauer et al. |
| 6,666,498 B1 | 12/2003 | Whitten |
| 6,685,256 B1 | 2/2004 | Schermer |
| 6,742,616 B2 | 6/2004 | Leban |
| 6,799,791 B2 | 10/2004 | Reiman et al. |
| 6,854,788 B1 * | 2/2005 | Graham ............... 296/180.4 |
| 6,959,958 B2 | 11/2005 | Basford |
| 6,986,544 B2 | 1/2006 | Wood |
| 7,008,004 B2 * | 3/2006 | Ortega et al. ............. 296/180.1 |
| 7,008,005 B1 | 3/2006 | Graham |
| 7,207,620 B2 | 4/2007 | Cosgrove et al. |
| 7,240,958 B2 | 7/2007 | Skopic |
| 7,255,387 B2 | 8/2007 | Wood |
| 7,318,620 B2 | 1/2008 | Wood |
| 7,431,381 B2 | 10/2008 | Wood |
| 7,484,791 B1 | 2/2009 | Chen |
| 7,537,270 B2 | 5/2009 | O'Grady |
| 7,585,015 B2 | 9/2009 | Wood |
| 7,618,086 B2 | 11/2009 | Breidenbach |
| 7,625,034 B1 | 12/2009 | Fitzgerald |
| 7,641,262 B2 | 1/2010 | Nusbaum |
| 7,699,382 B2 | 4/2010 | Roush |
| 7,740,304 B1 | 6/2010 | Breu |
| 7,748,771 B2 | 7/2010 | Distel et al. |
| 7,765,044 B2 | 7/2010 | Neuburger |
| 7,784,854 B2 | 8/2010 | Breidenbach |
| 7,837,254 B2 | 11/2010 | Reiman et al. |
| 7,845,708 B2 | 12/2010 | Breidenbach |
| 7,850,224 B2 | 12/2010 | Breidenbach |
| 7,854,468 B2 | 12/2010 | Vogel et al. |
| 7,857,376 B2 | 12/2010 | Breidenbach |
| 7,862,102 B1 | 1/2011 | Benton |
| 7,950,720 B2 | 5/2011 | Skopic |
| 7,976,096 B2 * | 7/2011 | Holubar ............... 296/180.1 |
| 8,007,030 B2 | 8/2011 | Wood |
| 8,025,329 B1 | 9/2011 | Kron |
| 8,025,330 B2 | 9/2011 | Reiman et al. |
| 8,033,594 B2 | 10/2011 | Nusbaum |
| 8,091,951 B1 | 1/2012 | Fitzgerald |
| 8,100,461 B2 | 1/2012 | Smith et al. |
| 8,136,868 B2 | 3/2012 | Nusbaum |
| 8,177,287 B2 | 5/2012 | Vogel et al. |
| 8,196,993 B2 | 6/2012 | Smith et al. |
| 8,196,994 B2 | 6/2012 | Chen |
| 8,196,995 B2 | 6/2012 | Chen |
| 8,235,456 B2 | 8/2012 | Nusbaum |
| 8,251,436 B2 | 8/2012 | Henderson et al. |
| 8,272,680 B2 | 9/2012 | Breidenbach |
| 8,303,025 B2 | 11/2012 | Senatro |
| 8,342,594 B2 | 1/2013 | Benton |
| 8,342,595 B2 | 1/2013 | Henderson et al. |
| 8,360,507 B2 | 1/2013 | Benton |
| 8,360,509 B2 | 1/2013 | Smith et al. |
| 8,360,510 B2 | 1/2013 | Smith et al. |
| 8,382,194 B2 | 2/2013 | Wood |
| 8,480,161 B2 | 7/2013 | Pfaff |
| 8,480,162 B2 | 7/2013 | Breidenbach |
| 8,491,036 B2 | 7/2013 | Henderson et al. |
| 8,492,036 B2 | 7/2013 | Kim |
| 8,579,357 B2 | 11/2013 | Nusbaum |
| 8,608,228 B2 | 12/2013 | Visentin |
| 8,622,461 B2 | 1/2014 | Breidenbach |
| 8,672,391 B1 | 3/2014 | Cobb |
| 8,684,447 B2 | 4/2014 | Henderson et al. |
| 8,697,047 B2 | 4/2014 | LeBuannec et al. |
| 8,708,399 B2 | 4/2014 | Smith et al. |
| 8,746,779 B1 | 6/2014 | Mazyan |
| 8,770,649 B2 | 7/2014 | Praskovsky et al. |
| 8,770,650 B1 | 7/2014 | Brosseau |
| 8,777,297 B2 | 7/2014 | Meredith et al. |
| 8,783,757 B2 | 7/2014 | Henderson et al. |
| 9,049,609 B1 | 6/2015 | Reeves et al. |
| 9,056,636 B2 | 6/2015 | Henderson et al. |
| 9,139,238 B2 | 9/2015 | Visser |
| 9,145,177 B2 * | 9/2015 | Smith et al. |
| 9,283,996 B2 | 3/2016 | Meredith et al. |
| 9,333,993 B2 | 5/2016 | Telnack |
| 9,371,097 B1 | 6/2016 | Conny |
| 9,616,944 B2 * | 4/2017 | Baker ............... B62D 35/001 |
| 9,708,015 B2 * | 7/2017 | Dieckmann ......... B62D 35/001 |
| 9,764,782 B2 * | 9/2017 | Breidenbach ....... B62D 35/002 |
| 9,776,674 B2 * | 10/2017 | Baker ............... B62D 35/001 |
| 2007/0089531 A1 | 4/2007 | Wood |
| 2008/116715 A1 | 5/2008 | Steel |
| 2008/0157560 A1 | 7/2008 | Spector |
| 2008/0309122 A1 * | 12/2008 | Smith ............... B62D 35/001 |
| | | 296/180.1 |
| 2009/0026797 A1 | 1/2009 | Wood |
| 2009/0236872 A1 | 9/2009 | Wood |
| 2010/0106380 A1 * | 4/2010 | Salari et al. ............. 701/49 |
| 2010/0194144 A1 | 8/2010 | Sinha |
| 2011/0084516 A1 * | 4/2011 | Smith ............... B62D 35/001 |
| | | 296/180.4 |
| 2011/0115254 A1 | 5/2011 | Skopic |
| 2012/0126572 A1 | 5/2012 | Hjelm et al. |
| 2012/0292945 A1 | 11/2012 | Hashimoto et al. |
| 2013/0076063 A1 | 3/2013 | Ryan et al. |
| 2013/0076064 A1 | 3/2013 | Smith et al. |
| 2013/0106136 A1 * | 5/2013 | Smith et al. ............. 296/180.4 |
| 2013/0175824 A1 | 7/2013 | Smith et al. |
| 2013/0214557 A1 | 8/2013 | Smith et al. |
| 2014/0019010 A1 * | 1/2014 | Smith et al. ............. 701/49 |
| 2014/0117713 A1 | 5/2014 | Baker |
| 2015/0035312 A1 | 2/2015 | Grandominico et al. |
| 2015/0166129 A1 | 6/2015 | Camosy |
| 2015/0329152 A1 | 11/2015 | Baker et al. |
| 2016/0009322 A1 * | 1/2016 | Telnack ............... B62D 35/007 |
| | | 296/180.4 |
| 2016/0046333 A1 | 2/2016 | Baker |
| 2016/0152285 A1 | 6/2016 | Wiegel |
| 2016/0152286 A1 | 6/2016 | Meredith et al. |
| 2016/0185399 A1 | 6/2016 | Smith et al. |
| 2016/0185401 A1 | 6/2016 | Breidenbach |
| 2016/0200377 A1 | 7/2016 | Grandominico et al. |
| 2016/0236726 A1 * | 8/2016 | Baker ............... B62D 35/001 |
| 2016/0251040 A1 * | 9/2016 | De Bock ............ B62D 35/001 |
| | | 296/180.4 |
| 2016/0304138 A1 * | 10/2016 | Dieckmann ......... B62D 35/001 |
| 2016/0347380 A1 * | 12/2016 | Dieckmann ......... B62D 35/001 |
| 2017/0021873 A1 * | 1/2017 | Dieckmann ......... B62D 35/001 |

OTHER PUBLICATIONS

Kodiak Innovations—"Bumper Bullet" from www.slipstreemaero.com (2 pages), Jan. 13, 2014.

(56) References Cited

OTHER PUBLICATIONS

Aerovolution—Revolutionary Inflatable Aerodynamic Solutions from www.aerovolution.com/information.shtml (2 pages), Oct. 13, 2014.
SmartTruck New Product Release: Low Profile Side Failings Changing the Shape of Trucking, slide show for Mid-America Trucking Show, (7 pages), Mar. 21-23, 2013.
Trailer Fairings Be Road Smart from www.beroadsmart.com/Vortex_Generators-2.html (2 pages), Jan. 9, 2014.
Solus Aero Package from www.solusinc.com/aero.html (2 pages), Jan. 9, 2014.
Spoiler from www.ats-green.com/smarttail.htm (2 pages), May 8, 2015.
PCT /US2013/045661 International Search Report dated Nov. 14, 2013 (2 pages).
PCT/US2013/045661 International Preliminary Report on Patentability dated Nov. 14, 2013 (6 pages).
U.S. Office Action on U.S. Appl. No. 14,407,674 dated Feb. 17, 2016 (10 pages).
Office Action U.S. Appl. No. 14/049,506 dated Jul. 1, 2014 (9 pages).
Office Action U.S. Appl. No. 14/049,506 dated Feb. 24, 2015 (10 pages).
Office Action U.S. Appl. No. 14/709,980 dated Jun. 16, 2016 (12 pages).
EP 13803764 Supplementary European Search Report and Written Opinion of the Supplementary European Search Report, dated Jan. 26, 2016 (6 pages).

\* cited by examiner

AERODYNAMIC REAR DRAG REDUCTION SYSTEM FOR A TRAILER

This application is a Continuation of U.S. patent application Ser. No. 14/049,506 filed Oct. 9, 2013 entitled AERODYNAMIC REAR DRAG REDUCTION SYSTEM FOR A TRAILER, which claims priority under 35 U.S.C. §119(e) to U.S. Provisional Patent Application Ser. No. 61/720,163 filed Oct. 30, 2012 entitled AERODYNAMIC REAR DRAG REDUCTION SYSTEM FOR A TRAILER, the entirety of each of which is hereby incorporated by reference herein.

FIELD OF THE INVENTION

The present invention relates generally to semi-trailers, such as van-type trailers, for example. In particular, the present invention relates to an aerodynamic rear tail system for reducing drag on such a trailer.

BACKGROUND OF THE INVENTION

To reduce wind flow resistance and drag on a trailer, truck, semitrailer, or other vehicle, side skirts which extend downwardly from a bottom of the trailer and/or chassis toward the roadway to partially enclose the floor assembly and undercarriage of the trailer, fairings and other such structures have been used. Many structures associated with the rear of the trailer are provided in order to also reduce the aerodynamic drag on the trailer.

A typical storage container of a trailer terminates with a large, rectangular rear surface. This shape causes an area of reduced pressure to be created behind the trailer storage container as it moves over the highway, thus generating a slowing force that must be overcome with additional engine power and thus additional fuel. In other words, air flow passing behind the vehicle imparts a drag force to the vehicle. Rear trailer fairings are designed to streamline the rear end of the trailer in order to control the flow of air at the rear of the vehicle. Such reduction on the drag of the ground vehicle may operate to conserve fossil fuels as well as other sources of vehicle drive power for hybrid vehicles, battery-operated vehicles, and alternative fuel-based vehicles, for example. However, many such fairings which cover the rear end of the trailer also may cover the rear doors of the trailer which must be opened and closed by a user to load and unload the cargo within the storage area of the trailer in such a way that users may be required to dismount and mount the fairing(s) each time a loading or unloading operation is to be performed.

SUMMARY

The present invention may comprise one or more of the features recited in the attached claims, and/or one or more of the following features and combinations thereof.

According to one aspect of the present disclosure, a drag reduction system configured to be coupled to a rear frame assembly of a trailer including a rear frame and a rear swing door includes a main wall panel configured to be coupled to a vertical member of the rear frame to extend generally rearwardly of the trailer at least partially along a height of the trailer. The main wall panel is pivotable relative to the rear frame assembly between a deployed position wherein the inner surface of the wall panel is spaced-apart from the outer surface of the rear swing door, and a stowed position wherein the inner surface of the wall panel is adjacent to and engaged with the outer surface of the rear swing door.

In one illustrative embodiment, the main wall panel may be configured to extend below a bottom edge of a rear sill of the rear frame of the trailer.

In another illustrative embodiment, the main wall panel may define a length greater than a height of the sidewall of the storage container of the trailer.

In still another illustrative embodiment, a top edge of the main wall panel may be positioned at a non-perpendicular angle relative to inner and outer edges of the main wall panel.

In yet another illustrative embodiment, the drag reduction system may further include a secondary wall panel configured to be pivotably coupled to the rear swing door of the trailer. Illustratively, the secondary wall panel may be configured to be coupled to a top portion of the rear swing door. Further illustratively, the secondary wall panel may include a first portion configured to be coupled to a top portion of the rear swing door and a second portion pivotably coupled to the first portion for movement about an axis parallel to a top edge of the rear swing door. The second portion of the secondary wall panel may be configured to engage a top edge of the main wall panel when the main wall panel is in the deployed position. Further, an inner surface of the second portion of the secondary wall panel may be configured to engage and lie adjacent to an outer surface of the main wall panel when the main wall panel is in the stowed position.

In still another illustrative embodiment, an outer surface of the main wall panel may be configured to engage the sidewall of the trailer when the main wall panel is in the stowed position.

In yet another illustrative embodiment, the main wall panel may be automatically moved to the deployed position when a user moves the rear swing door to a fully-closed position. Further illustratively, the main wall panel may be automatically moved to the stowed position when a user moves the rear swing door to a fully-opened position.

In still another illustrative embodiment, the drag reduction system may also include an inner limit strap having a first end coupled to an inner surface of the main wall panel and a second end configured to be coupled to an outside surface of the rear swing door of the trailer. The inner limit strap may operate to prevent outward movement of the main wall panel relative to the swing door beyond a predetermined distance. Further illustratively, the drag reduction system may also include an outer limit strap having a first end coupled to an outer surface of the main wall panel and a second end configured to be coupled to the rear frame assembly of the trailer. The outer limit strap may operate to prevent inward movement of the main wall panel relative to the rear swing door beyond a predetermined distance.

According to another aspect of the present disclosure, a drag reduction system configured to be coupled to a rear frame assembly of a trailer includes a main wall panel configured to be coupled to the rear frame assembly to extend generally rearwardly of the trailer at least partially along a height of the trailer. The drag reduction system further includes a secondary wall panel configured to be coupled to the rear frame assembly to extend generally rearwardly of the trailer at least partially along a width of the trailer. The secondary wall panel is positioned above and engaged with the main wall panel.

In one illustrative embodiment, a top edge of the main wall panel may be engaged with and supports a bottom surface of the secondary wall panel.

In another illustrative embodiment, the main wall panel may be pivotable relative to the rear frame assembly about a vertical axis. Further, the secondary wall panel may be pivotable relative to the rear frame assembly about a horizontal axis. Illustratively, the drag reduction system may also include an inner limit strap and an outer limit strap. Illustratively, the inner limit strap may include a first end coupled to an inner surface of the main wall panel and a second end configured to be coupled to an outside surface of the rear frame assembly of the trailer in order to prevent outward movement of the main wall panel relative to the swing door beyond a predetermined distance. Further illustratively, the outer limit strap may include a first end coupled to an outer surface of the main wall panel and a second end configured to be coupled to the rear frame assembly of the trailer in order to prevent inward movement of the main wall panel relative to the rear frame assembly beyond a predetermined distance.

In still another illustrative embodiment, the main wall panel may be configured to extend below a bottom edge of a rear will of the rear frame of the trailer.

In yet another illustrative embodiment, the secondary wall panel may include a first portion configured to be coupled to a top portion of the rear frame assembly and a second portion pivotably coupled to the first portion for movement about an axis parallel to a top edge of the rear swing door.

According to still another aspect of the present disclosure, a drag reduction system configured to be coupled to a rear frame assembly of a trailer including a rear frame and a rear swing door includes a main wall panel configured to be coupled to the rear frame assembly to extend generally rearwardly of the trailer at least partially along a height of the trailer. The main wall panel is pivotable about a vertical axis relative to the rear frame assembly. The drag reduction system further includes a secondary wall panel including (i) a first portion configured to be coupled to a top portion of the rear frame assembly to extend at least partially along a width of the traile, and (ii) a second portion pivotably coupled to the first portion for movement about a horizontal axis relative to the rear frame assembly. The secondary wall panel is engaged with and supported by a top edge of the main wall panel.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1:
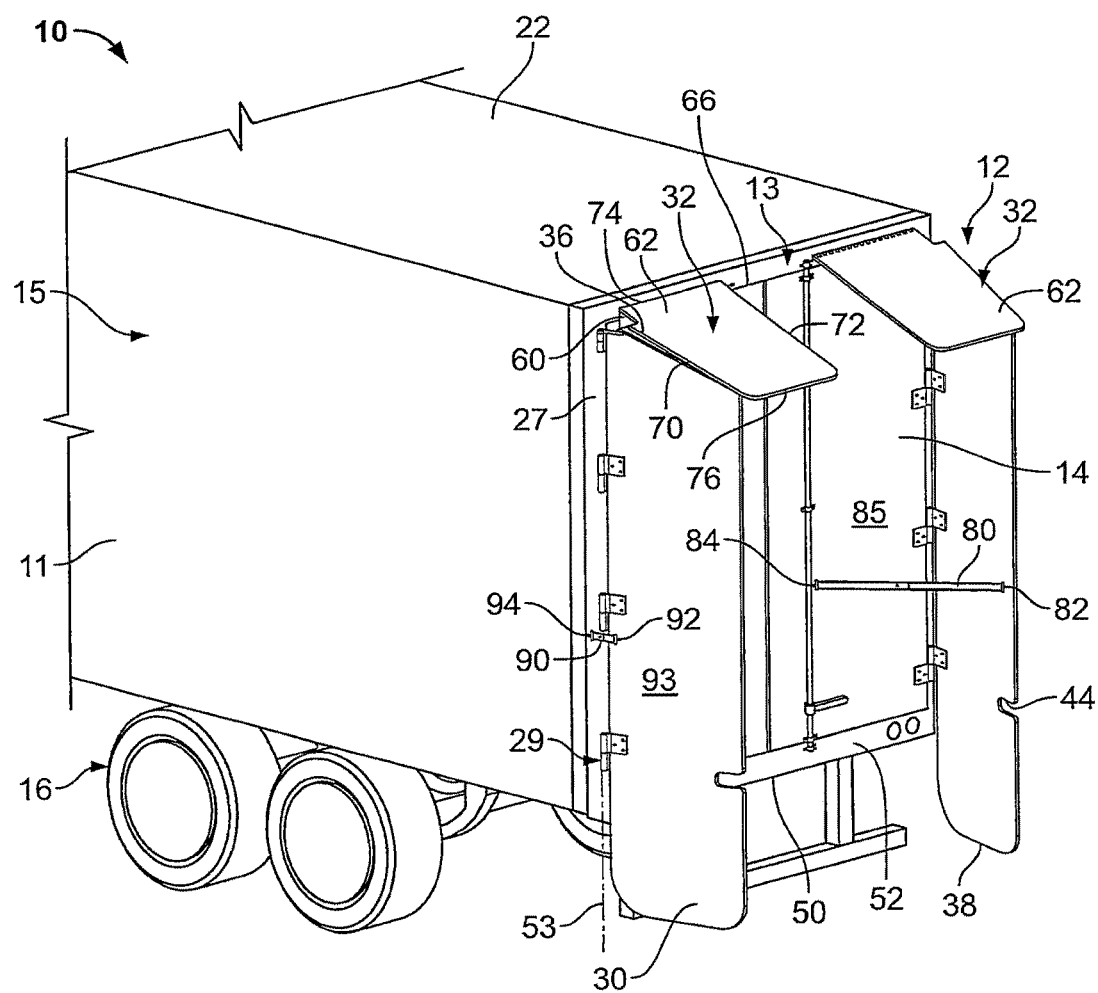
FIG. 1 is a perspective view of a rear end portion of a trailer showing a drag reduction system of the present disclosure including a rear fairing structure coupled to a rear frame of the trailer and shown in a fully-deployed position when the rear doors of the trailer are fully-closed.

Looking first to FIG. 1, a trailer 10 includes an aerodynamic rear drag reduction system 12 coupled to the rear frame assembly (including a rear frame 13 and rear doors 14 coupled to the rear frame 13) of the trailer 10. Illustratively, the drag reduction system 12 operates to improve the aerodynamic efficiency of the trailer 10 by reducing drag and wind flow behind the rear end of the trailer 10. In particular, the drag reduction system 12 operates to reduce airflow immediately behind the trailer 10 as the trailer 10 is traveling down the road. As is discussed in greater detail below, the airflow immediately behind the rear end of the trailer 10 is reduced because the drag reduction system 12 channels and controls the flow of air from the sides and top of the trailer 10 over the rear end of the trailer 10. This reduction of airflow behind the trailer 10 may increase the fuel efficiency, or the efficiency of any other source of vehicle drive power, of the tractor/trailer combination.

Figure 2:
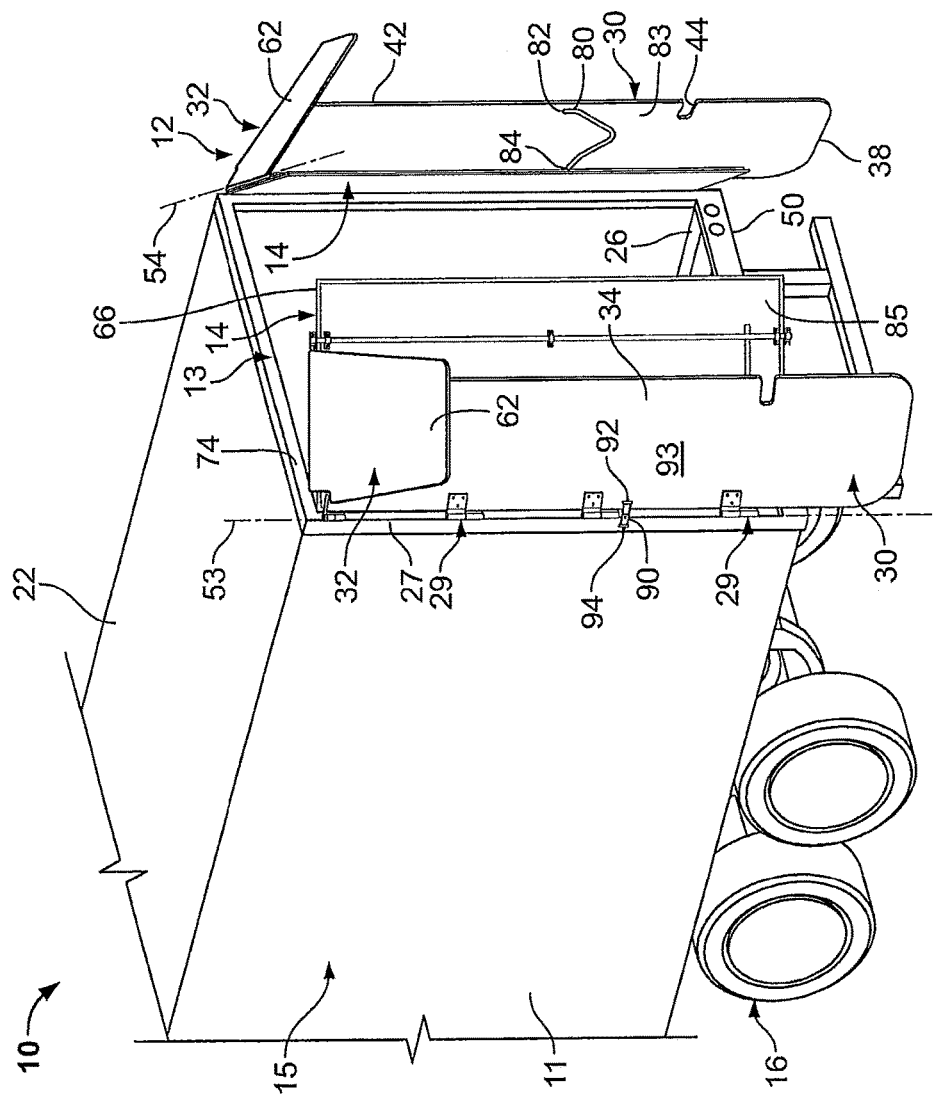
FIG. 2 is a perspective view similar to FIG. 1 showing the doors of the trailer partially opened such that the rear fairing structure is only partially deployed as it moves toward a fully-closed, or retracted, position.

Illustratively, the drag reduction system 12 extends behind the rear frame 13 and rear doors 14 of the trailer 10. As is further discussed in additional detail below, the drag reduction system 12 is movable with the rear doors 14 of the trailer 10 between a fully-deployed, or use, position, and a fully-closed, or storage position. As shown in FIGS. 1 and 2, the trailer 10 includes a storage container 15 configured to carry cargo therein. The storage container 15 includes sidewalls 11, a front end wall (not shown), the rear end frame assembly (including the rear frame 13 and doors 14), a roof 22, and a floor assembly 24 which all cooperate together to define an inside storage portion 25 of the container 15 that is able to store various articles or goods therein. The trailer 10 further includes a rear wheel assembly, or bogie, 16, and a front support or landing gear (not shown) each coupled to the floor assembly 24 of the trailer 10. Illustratively, the floor assembly 24 of the trailer 10 includes various laterally-extending cross members (not shown) as well as longitudinally-extending floor boards 26. The front end of the trailer 10 is configured to be coupled to a tractor (not shown) for towing the trailer 10 thereon, thus providing a tractor-trailer assembly. It should be understood that while the aerodynamic drag reduction system 12 is shown for use with a trailer 10, the drag reduction system 12 may be coupled to any vehicle to reduce the drag thereon.

Illustratively, the trailer 10 includes two drag reduction systems 12, as shown in FIG. 1. In particular, one system 12 is coupled to one rear swing door 14 of the trailer 10, while the other system 12 is coupled to the other rear swing door 14 of the trailer 10. For the purposes of the description herein, however, only one drag reduction system 12 will be described herein. However, it should be understood that the two drag reduction systems 12 of the trailer 10 are identical in configuration and function.

As shown in FIGS. 1 and 2, the drag reduction system 12 includes a main wall panel 30 and a secondary wall panel 32. As shown in FIG. 1 and discussed in greater detail below, the main wall panel 30 is generally vertically-oriented and is hingedly coupled to a vertical member 27 of the rear frame assembly 13 of the trailer 10. The auxiliary wall panel 32 is adjacent the main wall panel 30 and is hingedly coupled to a top end of the swing door 14.

As shown in FIG. 1, the left main wall panel 30 of the first drag reduction system 12 is coupled to the left-most vertical member 27 of the rear frame 13 of the trailer 10 while the right main wall panel 30 of the second drag reduction system 12 is coupled to the right-most vertical member 27 of the rear frame 13 of the trailer 10. Illustratively, four hinges 29 are provided to pivotably couple the main wall panel 30 to the rear frame 13. However, it should be understood that any suitable number of hinges may be used as well. Further, the hinge 29 may be any suitable hinge to allow for pivotable movement of the main and secondary wall panels 30, 32 such as, but not limited to, a butt hinge, a butterfly hinge, a living hinge, etc., in order to allow the allow the main wall panel 30 and the auxiliary wall panel 32 to hingedly move relative to the rear frame assembly 13 of the trailer 30 along a pivot axis 53 defined by the hinges.

Figure 3:
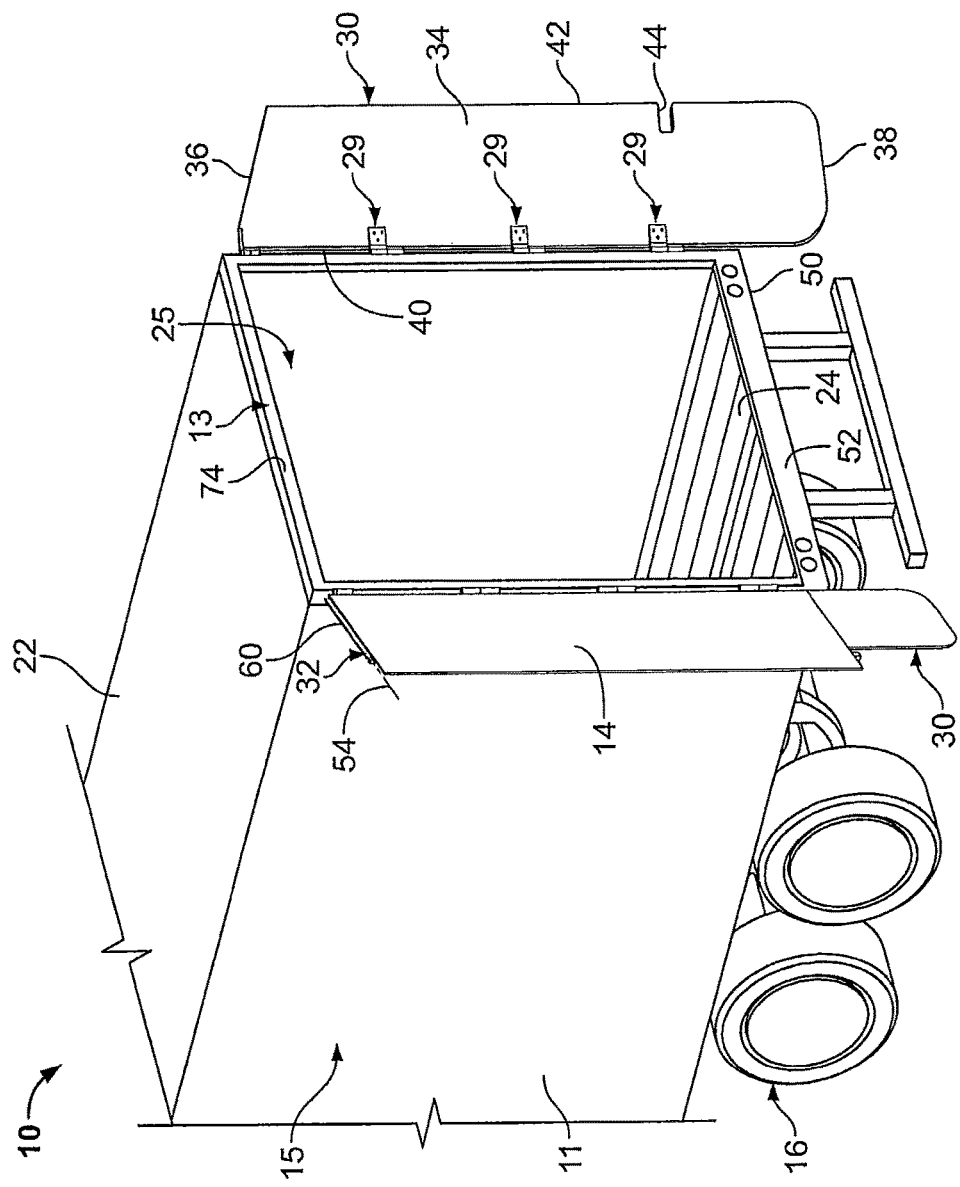
FIG. 3 is a perspective view similar to FIGS. 1 and 2 showing the doors in an opened position (with one door removed in order to better view the rear fairing structure) and showing the rear fairing structure retracted and positioned adjacent an outer surface of the door.

As shown in FIG. 3, the main wall panel 30 includes a generally rectangular body 34 defined by a top edge 36, a bottom edge 38, an inside edge 40, and an outside edge 42. Illustratively, the inside and outside edges 40, 42 are parallel to each other and to the vertical post 27 of the rear frame assembly 13. The bottom edge 38 generally extends horizontally and is perpendicular to the inside and outside edges 40, 42. As shown in FIG. 3, the outside edge 42 includes a notch 44 formed therein. As is discussed in greater detail below, the notch 44 operates to provide an opening for the door locking mechanisms and/or handles (not shown) of the rear door 14 to allow the panel 30 to be able to lie generally flat against an outer surface of the rear door 14 when in the closed, or retracted, position. The top edge 36, however, is not parallel to the bottom edge 38 and is not perpendicular to the inside and outside edges 40, 42. Rather, the top edge 36 is angled relative to the other edges 38, 40, 42. Particularly, the top edge 36 is angled downwardly from the outside edge 40 to the inside edge 42. It should be understood that while the top edge 36 is shown to be angled downwardly, it is within the scope of this disclosure for the top edge 36 to be generally horizontal or angled upwardly as well. Further, it is within the scope of this disclosure to include a body 34 of the main wall panel 30 defining inside and outside edges which are not parallel to each other or to the vertical post 27 of the rear frame 13 to which the main wall panel 30 is attached. As is discussed in greater detail below, the top edge 36 of the panel 30 operates to support the secondary wall panel 32 thereon when the drag reduction system 12 is in the use position, as shown, for example, in FIG. 1.

Illustratively, the body 34 of the main wall panel 30 extends below a bottom edge 50 of the rear sill 52 of the rear frame 13 of the trailer 10 such that the bottom edge 38 of the main wall panel 30 is positioned below the bottom edge 50 of the rear frame 13, as shown in FIGS. 1-4. As such, an overall length of the outside edge 40 of the main wall panel 30 is longer than an overall length of the rear frame 13 of the trailer 10. Further, an overall length of the outside edge 40 of the main wall panel 30 is greater than a height of the sidewall 11 of the storage container 15 of the trailer 10. While the illustrative main wall panel 30 extends below the rear frame 13, it should be understood that it is within the scope of this disclosure to include a main wall panel 30 having any suitable length including one which does not extend below the rear frame 13 of the trailer 10 and/or one which is generally equivalent in length to the rear frame 13 of the trailer 10.

As shown in FIGS. 1 and 2, the secondary wall panel 32 is coupled to a top portion of the rear swing door 14 and is configured to pivot about an axis 54 relative to the swing door 14. Illustratively, the secondary wall panel 32 includes a first portion 60 and a second portion 62 hingedly coupled to the first portion 60. The first portion 60 is coupled to the top portion of the swing door 14 and is configured to extend above a top edge 66 of the swing door 14. Illustratively, the first portion 60 extends generally upwardly to define a planar surface generally parallel to the outer surface of the swing door 14. The second portion 62 of the secondary wall panel 32 is coupled to the first portion 60 via a hinged connection. As shown in FIGS. 1 and 2, and as is discussed in greater detail below, the second portion 62 is configured to extend outwardly away from the first portion 60 and away from the swing door 14, as shown in FIG. 1 when the drag reduction system 12 is in the fully-deployed, or use, position. The second portion 62 is also configured to lie generally adjacent the first portion 60 such that the outer surface of the second portion 62 is generally parallel to the first portion 60, as shown for example in FIG. 3, when the drag reduction system 12 is in the stowed position.

Illustratively, the second portion 62 defines first and second outer edges 70, 72, a top edge 74, and a bottom edge 76. As shown in FIG. 2, the side edges 70, 72 converge toward each other from the top edge 74 toward the bottom edge 76. Thus, a length of the bottom ledge 76 is smaller than a length of the top edge 74.

The drag reduction system 12 further includes an inner limit strap 80, shown in FIGS. 1 and 2. The inner limit strap 80 includes a first end 82 coupled to an inner surface 83 of the main wall member 30 and a second end 84 coupled to the outer surface 85 of the swing door 14. As is described in greater detail below, the inner limit strap 80 operates to limit the movement of the main wall panel 30 relative to the swing door 14. In addition to the inner limit strap 80, the drag reduction system 12 further includes an outer limit strap 90 having a first end 92 coupled to an outer surface 93 of the main wall panel 30 and a second end 94 coupled to the outer, vertical post 27 of the rear frame 13 of the trailer 10, as shown in FIGS. 1 and 2. As is discussed in greater detail below, the outer limit strap 90 also operates to limit movement of the main wall panel 30 relative to the swing door 14. In particular, the inner limit strap 80 operates to prevent outward swinging movement of the main wall panel 30 relative to the swing door 14 beyond a predetermined angle while the outer limit strap 90 operates to prevent inward swinging movement of the main wall panel 30 relative to the swing door 14 beyond a predetermined angle. The length of the limit straps 80, 90 may be made variable in order to selectively change the predetermined angle beyond which the door 14 is unable to swing (both outwardly and inwardly).

Figure 4:
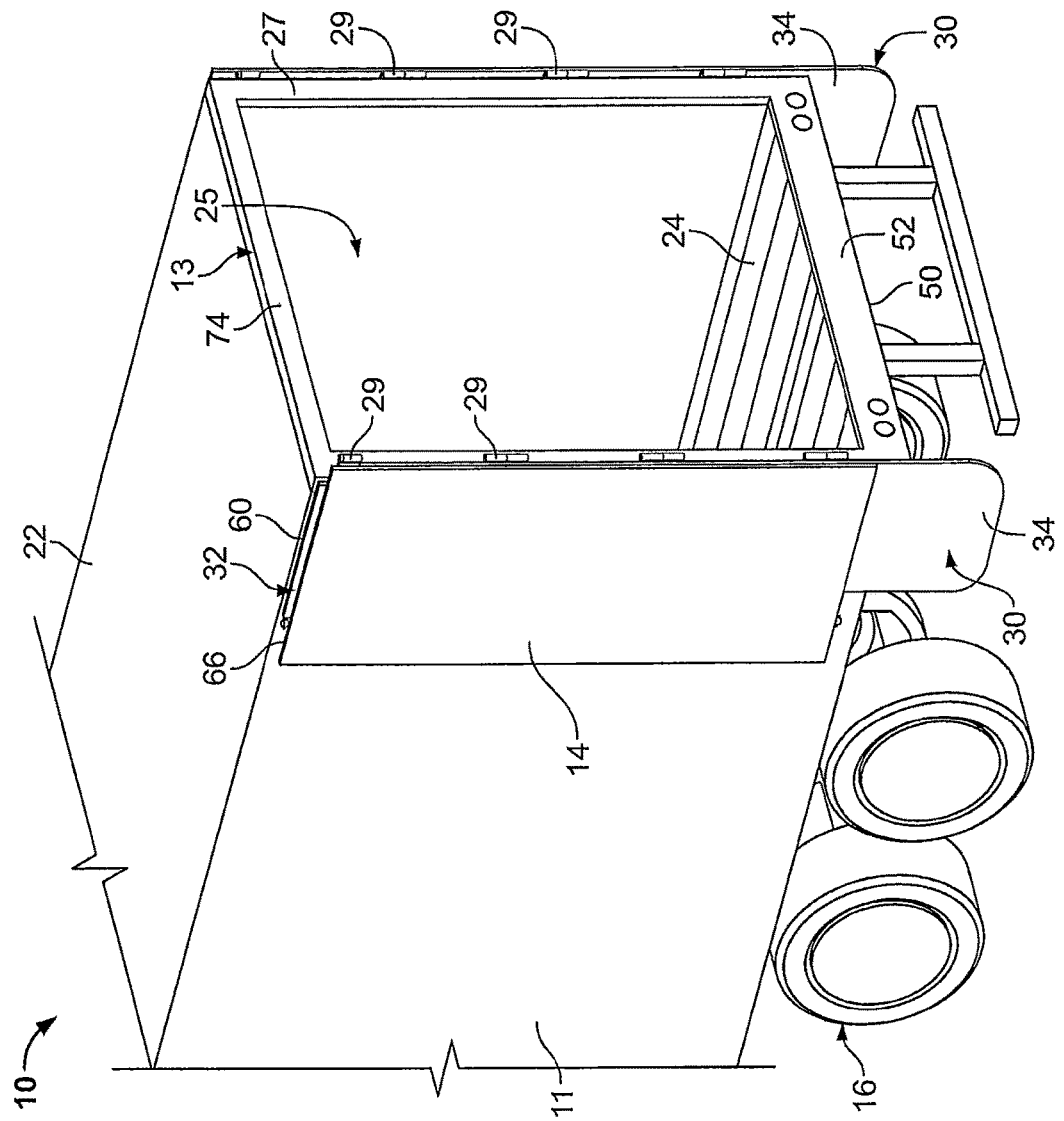
FIG. 4 is a perspective view similar to FIGS. 1-3 showing the doors of the trailer in a fully-opened position adjacent the sidewalls of the trailer and showing the rear fairing structure in the retracted position between the doors and the sidewalls of the trailer.

In use, as noted above, the drag reduction system 12 operates to increase aerodynamic efficiencies of the trailer 10 to which it is attached by smoothing the airflow behind the rear frame 13 of the trailer 10 as the trailer 10 travels along a highway, for example. Illustratively, the drag reduction system 12 is movable between a fully-deployed position, as shown in FIG. 1, and a retracted, or closed, position, as shown in FIGS. 3 and 4. In the fully-deployed position, the drag reduction system 12 is operable to reduce the drag of the trailer 10 as the trailer 10 travels along a highway, for example. As shown in FIG. 1, the main wall panel 30 extends outwardly away from the rear frame 13 of the trailer 10. Illustratively, the plane defined by the main wall panel 30 is neither parallel to nor perpendicular to a plane defined by the sidewall 11 of the trailer 10. The main wall panel 30 is similarly neither parallel to nor perpendicular to a plane defined by the rear frame 13. In other words, the main wall panel 30 is angled relative to the sidewall 11 of the trailer 10 and is angled relative to the rear frame 13 of the trailer 10. While the main wall panel 30 of the drag reduction system 12 is illustratively shown to be angled relative to the rear frame 13 by a particular degree, it should be understood, that it is within the scope of this disclosure to angle the main wall panel 30 relative to the rear frame 13 by any suitable degree.

In the fully deployed position, the inner limit strap 80 and the outer limit strap 90 cooperate to maintain the main wall panel 30 in the deployed position. As noted above, the inner limit strap 80 operates to prevent the main wall panel 30 from pivoting outwardly about the axis 53 relative to the rear frame 13 beyond a certain predetermined position while the outer limit strap 90 operates to prevent the main wall panel 30 from pivoting inwardly about the axis 53 relative to the rear frame 13 beyond a certain predetermined position. Illustratively, the inner and outer limit straps 80, 90 may be made from any suitable, flexible or bendable, but generally non-elastic material. Further, while only one inner strap 80 and one outer strap 90 are shown, it is within the scope of this disclosure to include any number of inner and/or outer straps for maintaining the deployed position of the main wall panel 30. Further, it is within the scope of this disclosure for the drag reduction system 12 to include devices other than the inner and outer straps 80, 90 for maintaining the deployed position of the main wall panel 30. In other words, other stops or limiters may be coupled to the main wall panel 30 in order to prevent outward movement of the main wall panel 30 relative to the swing door 14 of the trailer 10 beyond a certain predetermined position and to prevent inward movement of the main wall panel 30 relative to the rear frame 13 and the rear swing door 14 beyond a certain predetermined position.

Looking still to FIG. 1, the secondary panel 32 of the drag reduction system 12 extends outwardly from the rear swing door 14 of the trailer 10 when the system 12 is in the deployed position. Illustratively, an inner surface of the secondary panel 32 rests upon the top edge 36 of the main wall panel 30 when in the deployed position. As noted above, the top edge 36 of the main wall panel 30 is angled downwardly. As such, the secondary panel 32 is angled slightly downwardly as well. In other words, a plane defined by the second portion 62 of the secondary panel 32 is not parallel to a top surface of the roof assembly 22 of the trailer 10. Rather, the second portion 62 is angled downwardly.

When the drag reduction system 12 is in the deployed position, the swing doors 14 of the trailer 10 are closed. The main and secondary wall panels 30, 32 of each of the two drag reduction systems 12 extend outwardly from the rear frame 13 and rear swing doors 14 in order to direct and smooth air flow around the rear end of the trailer 10 as the trailer 10 travels down the highway, for example. The inner and outer limit straps 80, 90 maintain the position of the main wall panels 30 of each drag reduction system 12 while the second portion 62 of the secondary panel 32 rests upon the top edge 36 of the main wall panel 30 of each respective system 12.

When the trailer 10 is not traveling on the road and it is necessary for a user or operator to open the rear doors 14 of the trailer 10 in order to gain access to the storage area 25 of the storage container 15, the user need only open the doors 14 in the usual or typical manner and the drag reduction system 12 coupled to each door 14 automatically moves to its closed position, as shown in FIGS. 2-4. Looking to FIG. 2, as the swing door 14 is opened, the swing door 14 is moved toward the main wall panel 30 while the main wall panel 30 remains generally stationary relative to the trailer 10. As the swing door 14 is moved closer to the main wall panel 30, the bottom surface of the second portion 62 of the secondary panel 32 remains engaged with the top surface 36 of the main wall panel 30. Once the outer surface 85 of the swing door 14 engages the inner surface of the main wall panel 30, the top edge 36 of the main wall panel 30 no longer supports the second portion 62 of the secondary panel 32. Thus, the second portion 62 of the secondary panel 32 pivots downwardly about the axis 54 such that the bottom surface of the second portion 62 of the secondary panel 32 is engaged with the outer surface of the main wall panel 30. During movement of the swing door 14 toward the main wall panel 30, the inner limit strap 80 collapses such that there is not tension on the inner limit strap 80, as shown in FIG. 2. Looking to FIG. 4, once the door 14 is moved to the fully-opened position, the drag reduction system 12 is in the closed or retracted position and is located between the outside surface of the swing door 14 and the sidewall 11 of the trailer 10. The outside surface of the main wall panel 30 and the outside surface of the second portion 62 of the secondary panel 32 are each engaged with the sidewall 11 of the trailer 10. The inner surface of the main wall panel 30 is engaged with the outer surface 85 of the swing door 14.

In order to move the drag reduction systems 12 to the opened, or deployed, position, the user or operator need only move the doors 14 of the trailer 10 from their fully-opened position back to their fully-closed position, shown in FIG. 1. In use, therefore, as the doors 14 are closed, the drag reduction system 12 associated with each door 14 is automatically moved to the deployed position. In particular, as the swing door 14 is moved from the fully-opened position shown in FIG. 4 toward the closed position shown in FIG. 1, the drag reduction system 12 associated therewith moves with the door 14. As noted above, the secondary wall panel 32 is coupled to the door 14 for movement therewith. Further, when the drag reduction system 12 is in the fully-closed position (and the door 14 is in an opened position), the secondary wall panel 32 is positioned over the main wall panel 30 such that the secondary wall panel 32 moves with the door 14 as the door 14 is moved from the opened position to the closed position. As such, the main wall panel 30 is also urged to move with the door 14 because the secondary panel 32 covers the main panel 30 and carries it therewith.

As the door 14 is further moved toward the closed position and once the main wall panel 30 reaches the predetermined deployed position, the outer limit strap 90 prevents further movement of the main wall panel 30 with the door 14. As the door 14 is further moved toward the closed position, the main wall panel 30 remains generally stationary and the second portion 62 of the secondary wall panel 32 begins to pivot upwardly about the pivot axis 54. The second portion 62 is urged to pivot upwardly because as the secondary wall panel 32 continues to move with the door 14 as the door 14 moves to the closed position, the bottom surface of the second portion 62 of the secondary wall panel 32 remains supported by the top edge 36 of the main wall panel 30 and moves along this top edge 36 of the main wall panel 30 while the main wall panel 30 remains relatively stationary. As such, the second portion 62 of the secondary wall panel 32 is moved upwardly to the deployed position shown in FIG. 1.

In other words, it is not necessary to perform an extra step to move the drag reduction system 12 to the closed position prior to opening the trailer doors 14 or to move the drag reduction system 12 to the opened position after closing the door 14. Rather, the drag reduction system 12 automatically moves to the closed position upon opening the door 14 to which the drag reduction system 12 is attached and moving the door 14 to the fully opened position along the sidewall 11 of the trailer 10, as shown in FIG. 4. It should be understood that the drag reduction systems 12 of the present disclosure may be used alone or in conjunction with other drag reduction systems such as, for example, aerodynamic side skirts such as those disclosed in U.S. Pat. No. 8,177,286 and U.S. Patent Application Publication No. 2013/0249241, for example, the entirety of each of which is incorporated herein by reference.

Illustratively, each wall panel 30, 32 is made of a composite material. For example, the composite material may include a plastic core and metal outer skins coupled to the plastic core. Such a composite material provides a rigid, but lightweight and durable material. Illustratively, for example, each wall panel 30, 32 may be made of a DURAPLATE® composite panel provided by Wabash National Corporation of Lafayette, Ind. DURAPLATE® composite panels are constructed of a high-density polyethylene plastic core bonded between two high-strength steel skins.

The inner and outer skins respectively may be formed of a metal or metallic composition, examples of which include, but should not be limited to aluminum, galvanized steel, full hardened steel, such as AISI Grade E steel, or the like. In one illustrative embodiment, for example, the outer skin is formed of ASTM G90 galvanized steel, and the inner skin is formed o ASTM G40 galvanized steel. In alternative embodiments, the inner and/or outer skins respective may be formed of other rigid, semi-rigid, metallic or non-metallic materials. Illustratively, the composite material (i.e., panels 30, 32) is approximately between 0.08 inch and 0.20 inch thick, with a preferred thickness of approximately 0.10 inch thick. While the illustrative panels 30, 32 disclosed herein are each made of the particular composite material described above, it should be understood that other suitable composite materials may be used as well. For example, the panels 30, 32 may also be made from a plastic pultrusion with fiber reinforcements embedded inside the polymer material. The reinforcement fibers may be made from glass, carbon, and/or other suitable materials, for example.

It should be further understood that while the illustrative panels 30, 32 disclosed herein are made from a composite, the panels 30, 32 may alternatively be formed from a non composite material such as a sheet made from a metal, metal alloy, or plastic, for example. The panels 30, 32 may be made from ferrous or nonferrous materials including plastics or composites incorporating a combination of ferrous and/or nonferrous materials thereof. In particular, an alternative panel (not shown) may be made from galvanized steel. Of course, it is within the scope of this disclosure to include non-galvanized steel sheets, or other such non-composite panels, of any suitable thickness as well.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A drag reduction system configured to be coupled to a rear frame assembly of a trailer including a rear frame and a rear swing door, the drag reduction system comprising:
   a main wall panel configured to be pivotably coupled to the rear frame assembly to extend at least partially along a height of the trailer; and
   a secondary wall panel configured to be pivotably coupled to the rear swing door of the trailer adjacent a top edge of the rear swing door of the trailer to extend at least partially along a width of the trailer,
   wherein the drag reduction system is pivotable relative to the rear frame assembly between a deployed position wherein the main wall panel and the secondary wall panel each extend generally rearwardly of the trailer, and a stowed position wherein an inner surface of the main wall panel is adjacent to and engaged with the outer surface of the rear swing door and a bottom surface of the secondary wall panel is adjacent to and engaged with an outer surface of the main wall panel, and
   wherein the secondary wall panel is configured to engage a top edge of the main wall panel when the drag reduction system is in the deployed position.

2. The drag reduction system of claim 1, wherein a top edge of the main wall panel is positioned at a non-perpendicular angle relative to a pair of forward and rear edges of the main wall panel.

3. The drag reduction system of claim 2, wherein the top edge of the main wall panel angles downwardly when the main wall panel is in the deployed position.

4. The drag reduction system of claim 1, wherein the secondary wall panel is angled downwardly when the rear drag reduction system is in the deployed position.

5. The drag reduction system of claim 1, wherein the top edge of the main wall panel is positioned inwardly of an outer edge of the secondary wall panel when the rear drag reduction system is in the deployed position.

6. A drag reduction system configured to be coupled to a rear frame assembly of a trailer including a rear frame and a rear swing door, the drag reduction system comprising:
   a main wall panel configured to be pivotably coupled to the rear frame assembly to extend at least partially along a height of the trailer; and
   a secondary wall panel configured to be pivotably coupled to the rear swing door of the trailer adjacent a top edge of the rear swing door of the trailer to extend at least partially along a width of the trailer,
   wherein the drag reduction system is pivotable relative to the rear frame assembly between a deployed position wherein the main wall panel and the secondary wall panel each extend generally rearwardly of the trailer, and a stowed position wherein an inner surface of the main wall panel is adjacent to and engaged with the outer surface of the rear swing door and a bottom surface of the secondary wall panel is adjacent to and engaged with an outer surface of the main wall panel,
   wherein the secondary wall panel is configured to rest upon a top edge of the main wall panel when the drag reduction system is in the deployed position, and
   wherein the secondary wall panel extends farther rearwardly than the main wall panel when the rear drag reduction system is in the deployed position.

7. The drag reduction system of claim 6, wherein the main wall panel includes an opening that makes a door locking mechanism on the rear swing door accessible when the main wall panel is in the stowed position and engaged with the rear swing door.

8. A drag reduction system configured to be coupled to a rear frame assembly of a trailer, including a rear frame and a rear swing door, the drag reduction system comprising:
- a main wall panel configured to be coupled to the rear frame assembly to extend generally rearwardly of the trailer at least partially along a height of the trailer; and
- a secondary wall panel configured to be coupled to the rear frame assembly to extend generally rearwardly of the trailer at least partially along a width of the trailer,
- wherein the secondary wall panel is positioned above and engaged with the main wall panel,
- wherein a top outer edge of the main wall panel is engaged with and supports a bottom surface of the secondary wall panel and the top outer edge of the main wall panel is positioned inwardly of and spaced-apart from an outer edge of the secondary wall panel,
- wherein the secondary wall panel is angled downwardly and extends farther rearwardly than the main wall panel, and
- wherein movement of the main wall panel from its deployed position to its stowed position automatically causes the secondary wall panel to move from its deployed position to its stowed position adjacent the outer surface of the main wall panel.

9. The drag reduction system of claim 8, wherein the main wall panel is pivotable relative to the rear frame assembly between a deployed position wherein an inner surface of the wall panel is spaced-apart from the outer surface of the rear swing door, and a stowed position wherein the inner surface of the main wall panel is adjacent to and engaged with the outer surface of the rear swing door, and wherein the secondary wall panel is pivotable relative to the rear swing door between a deployed position wherein a bottom surface of the secondary wall panel is spaced-apart from the outer surface of the rear swing door, and a stowed position wherein the bottom surface of the secondary wall panel is adjacent to and engaged with the outer surface of the main wall panel.

10. The drag reduction system of claim 8, wherein the main wall panel is angled inwardly such that a rear edge of the main wall panel is positioned inwardly of a forward edge of the main wall panel.

11. The drag reduction system of claim 8, wherein an outer edge of the secondary wall panel is not parallel to an inner edge of the secondary wall panel.

12. The drag reduction system of claim 8, wherein a top edge of the main wall panel is not parallel to a bottom edge of the main wall panel.

13. The drag reduction system of claim 12, wherein the top edge of the main wall panel angles downwardly.

14. A drag reduction system configured to be coupled to a rear frame assembly of a trailer including a rear frame and a rear swing door, the drag reduction system comprising:
- a main wall panel configured to be coupled to the rear frame assembly to extend generally rearwardly of the trailer at least partially along a height of the trailer, wherein the main wall panel is pivotable about a vertical axis relative to the rear frame assembly; and
- a secondary wall panel configured to be coupled to a top portion of the rear swing door to extend at least partially along a width of the trailer for pivoting movement relative to the rear frame assembly, wherein the secondary wall panel is engaged with and supported by a top edge of the main wall panel,
- wherein the drag reduction system is pivotable relative to the rear frame assembly between a deployed position wherein the main wall panel and the secondary wall panel each extend generally rearwardly of the trailer, and a stowed position wherein the main wall panel and the secondary wall panel are generally planar with the rear frame assembly, and
- wherein the secondary wall panel extends farther rearwardly and outwardly than the main wall panel when the rear drag reduction system is in the deployed position.

15. The drag reduction system of claim 14, wherein a top edge of the main wall panel is engaged with and supports a bottom surface of the secondary wall panel.

16. The drag reduction system of claim 14, wherein the secondary wall panel is angled downwardly when the drag reduction system is in the deployed position.

17. The drag reduction system of claim 16, wherein a top edge of the main wall panel angles downwardly.

18. The drag reduction system of claim 14, wherein an inner surface of the main wall panel is adjacent to and engaged with the outer surface of the rear swing door and a bottom surface of the secondary wall panel is adjacent to and engaged with an outer surface of the main wall panel when the drag reduction system is in the stowed position.

19. The drag reduction system of claim 14, wherein the main wall panel and the secondary wall panel are configured to be coupled to the rear frame assembly and the top portion of the rear swing door, respectively, in a non-pneumatic manner.

* * * * *